US 9,458,954 B2

(12) United States Patent
Baur et al.

(10) Patent No.: US 9,458,954 B2
(45) Date of Patent: Oct. 4, 2016

(54) DOUBLE-WALL PIPE AND PRODUCTION PROCESS

(71) Applicant: Airbus Operations GmbH, Hamburg (DE)

(72) Inventors: Alexander Baur, Friedberg (DE); Christoph Heimerdinger, Langenargen (DE); Roland Lang, Woerth (DE); Thomas Langer, Friedberg (DE); Heinz Meister, Dorfen (DE); Josef Messner, Neusaess (DE); Dirk Schwarze, Langerringen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 241 days.

(21) Appl. No.: 13/959,074

(22) Filed: Aug. 5, 2013

(65) Prior Publication Data

US 2013/0312865 A1 Nov. 28, 2013

Related U.S. Application Data

(63) Continuation of application No. PCT/DE2012/000086, filed on Feb. 2, 2012.

(30) Foreign Application Priority Data

Feb. 5, 2011 (DE) .................. 10 2011 010 385

(51) Int. Cl.
*F16L 9/00* (2006.01)
*F16L 9/02* (2006.01)
(Continued)

(52) U.S. Cl.
CPC ................ *F16L 9/02* (2013.01); *B21D 51/10* (2013.01); *B23K 26/282* (2015.10); *F16L 7/00* (2013.01); *F16L 9/18* (2013.01); *F16L 9/20* (2013.01);
(Continued)

(58) Field of Classification Search
CPC ....... B21D 51/10; B23K 26/285; F16L 7/00; F16L 9/02; F16L 9/18; F16L 9/20
USPC ................... 138/114, 143, 145, 156–171
See application file for complete search history.

(56) References Cited

U.S. PATENT DOCUMENTS 1,512,961 A * 10/1924 Weil .............................. 138/145
3,141,479 A * 7/1964 Mickey ........................ 138/143
(Continued)

FOREIGN PATENT DOCUMENTS

DE 20 48 424 4/1972
DE 2854548 C2 7/1986
(Continued)

OTHER PUBLICATIONS

Chinese Patent Office, Chinese Office Action for Application No. 201280017347.6 Dated Dec. 3, 2014.
(Continued)

*Primary Examiner* — Partick F Brinson
(74) *Attorney, Agent, or Firm* — Lorenz & Kopf, LLP

(57) ABSTRACT

A double-wall pipe for a transportation means which includes an outer pipe and an inner pipe extending therein. The outer pipe has two pipe segments which are formed like half-shells and are joined together to form the outer pipe along the longitudinal edges thereof. In this way, it is possible to make both the outer pipe and the inner pipe of metal, such that the wall thickness of the inner pipe can be relatively small.

18 Claims, 3 Drawing Sheets

(51) Int. Cl.
*F16L 7/00* (2006.01)
*F16L 9/18* (2006.01)
*B21D 51/10* (2006.01)
*F16L 9/19* (2006.01)

(52) U.S. Cl.
CPC ..... *Y10T 29/49879* (2015.01); *Y10T 29/49893* (2015.01)

(56) References Cited

U.S. PATENT DOCUMENTS

| | | | | |
|---|---|---|---|---|
| 4,501,302 A | * | 2/1985 | Harwood | F01N 13/14 138/113 |
| 4,590,652 A | * | 5/1986 | Harwood | F01N 13/141 138/113 |
| 4,619,292 A | * | 10/1986 | Harwood | F01N 13/14 138/111 |
| 4,656,712 A | * | 4/1987 | Harwood | B21D 53/88 138/113 |
| 4,656,713 A | * | 4/1987 | Rosa et al. | 29/890.08 |
| 5,799,395 A | * | 9/1998 | Nording | F01N 13/08 29/890.036 |
| 5,901,754 A | * | 5/1999 | Elsasser | F01N 13/1816 138/118 |
| 5,913,336 A | * | 6/1999 | Ingram | F16L 39/02 138/109 |
| 6,009,908 A | * | 1/2000 | Hartnagel | B60H 1/00342 138/109 |
| 7,451,541 B2 | * | 11/2008 | Stastny et al. | 29/890.036 |
| 2006/0174962 A1 | | 8/2006 | Stastny | |
| 2006/0289074 A1 | * | 12/2006 | Eriksson et al. | 138/171 |
| 2009/0025815 A1 | | 1/2009 | Becks et al. | |
| 2010/0018599 A1 | | 1/2010 | Ferrer et al. | |
| 2010/0229992 A1 | * | 9/2010 | Witz | B29D 23/18 138/109 |
| 2011/0174409 A1 | * | 7/2011 | Higai | B21D 5/10 138/109 |

FOREIGN PATENT DOCUMENTS

| | | |
|---|---|---|
| DE | 8911914 U1 | 10/1990 |
| DE | 4209510 C1 | 5/1993 |
| DE | 4324458 B4 | 1/1994 |
| DE | 102009014985 A1 | 11/2010 |
| JP | H11248048 | 9/1999 |
| WO | 01/43872 | 6/2001 |

OTHER PUBLICATIONS

International Searching Authority, International Search Report for PCT/DE2012/000086 Mailed Jun. 6, 2012.
German Patent Office, German Office Action for Application No. 10 2011 010 385.6 Dated Nov. 7, 2011.
State Intellectual Property Office of the Peoples' Republic of China, Office Action for Chinese Patent Application No. 201280017347.6 mailed Jul. 9, 2015.
European Patent Office, European Patent Office Action for European Patent Application No. 12 714 931.8 mailed Feb. 5, 2016.
State Intellectual Property Office of the Peoples' Republic of China, Office Action for Chinese 3atent Application No. 201280017347.6 mailed Nov. 20, 2015.

* cited by examiner

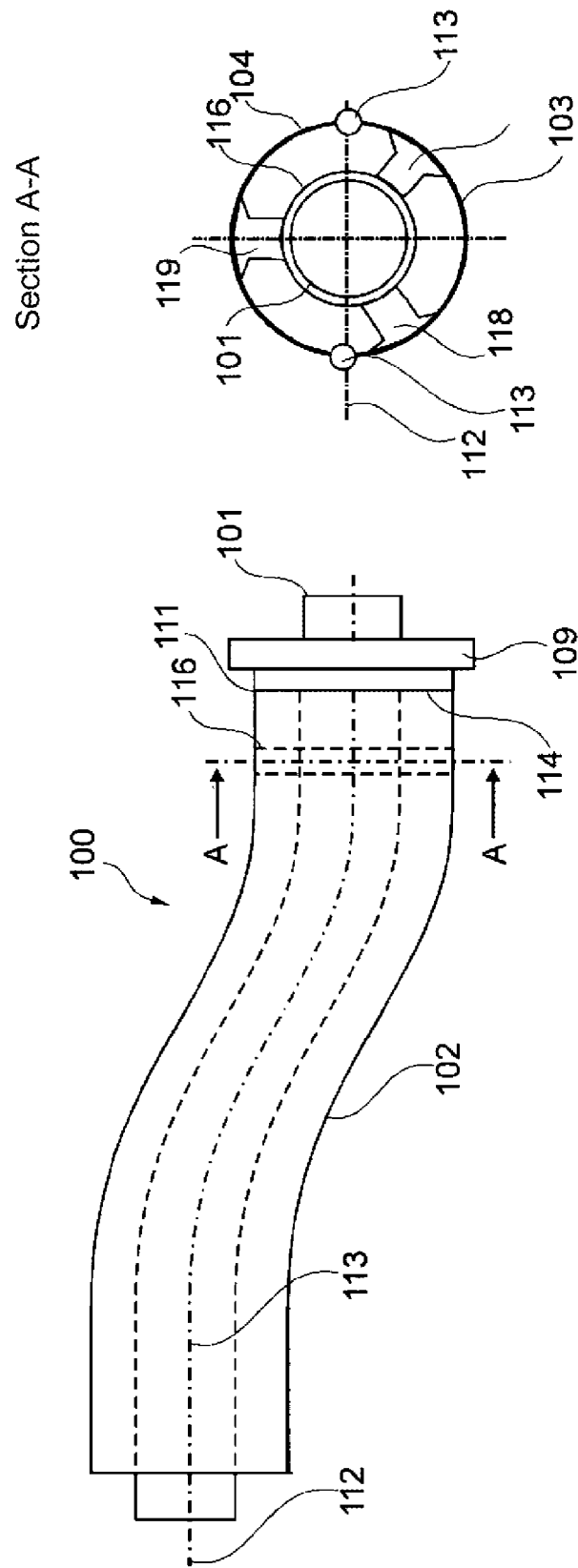

DOUBLE-WALL PIPE AND PRODUCTION PROCESS

CROSS-REFERENCE TO RELATED APPLICATIONS

This is a continuation of International Application No. PCT/DE2012/000086, filed Feb. 2, 2012, which application claims priority to German Application No. 10 2011 010 385.6, filed Feb. 5, 2011, which are each incorporated herein by reference in their entirety.

TECHNICAL FIELD

The technical field relates to double-wall pipes. In particular, the technical field relates to a double-wall pipe, in one example, for a transport means, a transport means with a double-wall pipe and a method of producing a double-wall pipe.

BACKGROUND

In transport means, and in particular in aircraft, double-wall pipes are joined together to form pipelines for fuel systems. These pipes have an inner pipe and an outer pipe which surrounds the inner pipe while forming an intermediate space. The pipelines can then be used for example for supplying fuel to an additional turbine-driven auxiliary power unit in the rear of the aircraft or for connecting the trim tank, which is generally accommodated in the horizontal stabiliser, to the main tank of the aircraft.

The pipelines for aircraft should be designed with double walls in accordance with relevant safety and aviation regulations for the prevention of accidents.

Furthermore the use of the double-wall pipes for the purpose of heat transfer is possible. In this case a fluid flows through the inner pipe. Likewise a fluid flows through the space between the inner and the outer pipe, wherein a temperature difference exists between these two fluids. The flow direction is dependent upon the field of use and also the state of matter of the two fluids. The heat transfer is also influenced inter alia by the conductivity of the materials the two pipes. Possible fields of use are both in the construction of stationary and mobile equipment and in transport means.

Double-wall curved pipes have for example an outer pipe into which a hose is inserted coaxially. The distance between the hose and the outer pipe is ensured by spacers which support the hose coaxially with respect to the outer pipe. For geometric reasons, however, it may be that a rigid bent inner pipe cannot be integrated (or inserted) into a similarly shaped outer pipe, as is the case in particular with substantial or multiple curvatures.

DE 10 2005 028 766 B4 and US 2009/0025815 A1 describe curved pipelines with a metal inner pipe. During production a support core made from polystyrene is laid around the inner pipe and is then wrapped around with fibre-reinforced epoxy resin material. After the curing of the outer pipe produced in this way from fibre-reinforced epoxy resin material the support core of polystyrene is removed by washing out with a solvent.

Other objects, desirable features and characteristics will become apparent from the subsequent summary and detailed description, and the appended claims, taken in conjunction with the accompanying drawings and this background.

SUMMARY

According to various teachings of the present disclosure, provided is an alternative double-wall pipe and a corresponding method of production.

According to one of various exemplary aspects of the present disclosure, a double-wall pipe is provided, wherein the pipe has an outer pipe and an inner pipe extending in the outer pipe. The inner pipe is designed to convey a fluid (for example a gas, a gas mixture or a liquid) and is spaced apart from the outer pipe. In one example, the double-wall pipe may be designed as a fuel line.

The outer pipe has two pipe segments in the form of half-shells or two or more channel-like pipe segments which are joined together along their longitudinal edges in order to form the outer pipe.

In this way it is possible to provide robust double-wall pipes which have a comparatively low external diameter and thus a comparatively low overall weight. Likewise it is possible to provide double-wall pipes with substantial or multiple curvatures.

In a corresponding manner a T-connection can also be produced for such pipes.

According to an embodiment of the present disclosure, the inner pipe is metallic. In this way the wall thickness of the inner pipe can have correspondingly small dimension, so that a relatively small external diameter can be produced.

According to another exemplary embodiment of the present disclosure the outer pipe is metal.

For example the outer pipe can comprise aluminum, a specific aluminum alloy, iron, nickel base, zinc, magnesium or titanium. Likewise the inner pipe can comprise aluminum, a specific aluminum alloy, iron, nickel, zinc, magnesium or titanium. Any metal which can be welded can be used for the outer pipe. In addition, pipes which are made of alloys which cannot be fusion-welded can be used as the inner pipe. Depending upon the application the inner pipe can also comprise plastics material or a reinforced plastics material.

In one example, it may be advantageous if both the outer and the inner pipe comprise a material which can be welded, so that the pipe segments of the outer pipe can be welded to one another at manufacture and so that flange connections can be welded on at both ends of the double-wall pipes. The flange connections on the ends can also be swaged.

According to one exemplary embodiment of the present disclosure the two pipe segments in the form of half-shells of the outer pipe are produced by splitting an initial pipe.

Thus the initial pipe can be fabricated independently of the inner pipe and is then split along its length into two or more parts. The inner pipe can be provided with spacers and the different parts (segments) of the initial pipe can then be laid around the inner pipe and connected (joined) to one another.

According to one embodiment of the present disclosure, the double-wall pipe is a bent pipe. For example the two pipe segments in the form of half-shells of the outer pipe are produced by splitting the initial pipe along the neutral bending line of the bent initial pipe. Naturally the initial pipe can also be parted on any other straight or curved line.

The neutral bending line is the common centre line of the inner and outer pipe after the different pipe components are assembled. The neutral bending line is distinguished in that relative to the outer pipe it constitutes the plane in which the outer pipe is not stretched or compressed or is at least only slightly stretched or compressed during bending. Moreover the least "distortion" is to be expected on parting and the joining together is possible in a relative simple manner in terms of clamping. This plane defines the parting lines (also called separation points) along which the outer pipe is divided after the bending operation. Likewise this plane defines the position of the joining lines produced when the outer pipe segments are joined together, which may for example be weld seams.

According to one of various exemplary embodiments of the present disclosure the double-wall pipe is one pipe of a fuel line. Such a fuel line may comprise a plurality of these double-wall pipes which are positioned adjacent to one another. Alternatively it may be a hydraulic line. It is generally a line with special safety relevance.

According to one aspect of the present disclosure a transport means is provided with a double-wall pipe described above and below.

The transport means is for example an aircraft, a water craft, a rail vehicle or a road vehicle.

In one example, it may be a passenger aircraft.

According to one of various aspects of the present disclosure a method for producing a double-wall pipe and a method for producing a T-connection for connecting double-wall pipes are provided. First of all an inner pipe is constructed. Furthermore an initial pipe separate from the inner pipe is constructed, which has a larger diameter than the inner pipe.

Then the initial pipe is split into two or more pipe segments. If the initial pipe is split into precisely two pipe segments it may for example involve pipe segments which are in the form of complementary, that is to say largely similar, half-shells. In this case the splitting of the initial pipe takes place for example along the neutral bending line of the initial pipe, in particular if the double-wall pipe is a bent pipe. It can also be parted along another straight or curved line.

Then the inner pipe is positioned in the first pipe segment in the form of a half-shell, whereupon the two pipe segments in the form of half-shells are joined together in order to form the outer pipe.

According to another embodiment of the present disclosure the pipe thus produced is a double-wall pipe described above and below, in particular a fuel line. Alternatively it may be a hydraulic line.

According to one embodiment of the present disclosure the method includes joining one or two flanges to one or both ends of the outer pipe, so that different double-wall pipes produced in this way can be connected to one another in order to form a complete pipeline.

According to one exemplary embodiment of the present disclosure a surface protection is then applied to an inner face and to an outer face of the outer pipe.

In one example, the inner pipe and the outer pipe can be made of metal or a metal alloy, in which case the pipe segments into which the initial pipe has been split can be joined together by welding.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1A shows a double-wall bent pipe according to one of various embodiments of the present disclosure.

FIG. 1B shows a sectional representation along the section line A-A in FIG. 1A.

DETAILED DESCRIPTION

Figure 2A:
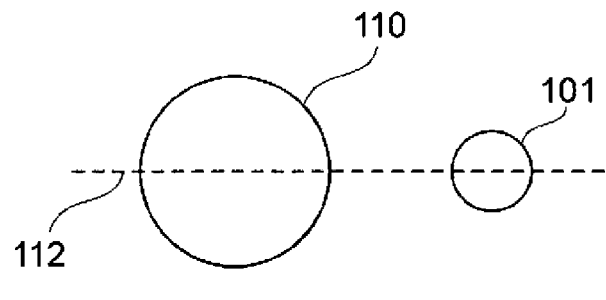
FIGS. 2A-2C show a method for production of a double-wall pipe according to one of various embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

FIG. 1A shows a double-wall pipe 100 according to one exemplary embodiment of the present disclosure. The double-wall pipe 100 has an inner pipe 101 and an outer pipe 102 at least partially surrounding the inner pipe. At one end 111 of the outer pipe 102 a flange 109 is attached, said flange being for example welded onto the outer pipe 102 or connected to the outer pipe 102 in some other way. For example it is possible for the flange to be screwed on and/or adhered. A flange may also be attached at the opposite end.

The flange is welded on for example along the weld line 114 at the end.

On the central axis of the two pipes 101, 102 is located the neutral bending line 112, which is generally used as the parting plane and defines the position of the parting points 113 of the initial pipe.

Furthermore a plurality of spacers 116 can be provided which ensure that the inner pipe 101 is positioned coaxially with the outer pipe 102.

For this purpose these spacers 116 can be placed for example annularly around the inner pipe and can have a plurality of "legs" 117, 118, 119 which for example enclose an angle of about 120 degrees relative to one another and ensure the support between the inner pipe 101 and the inner wall of the outer pipe 102. This can be seen in FIG. 1B, which shows a sectional representation along the section line A-A in FIG. 1A.

FIG. 1B also shows the two weld seams along the two parting lines 113 by which the upper half-shell 104 of the outer pipe is connected to the lower half-shell 103 of the outer pipe.

It should be noted that in FIGS. 1A and 1B the ratio of length to diameter of a typical pipe is shown shortened. Pipe diameters of up to about 145 mm or above may be provided. In one example, the outer pipes may have diameters of about 50 mm. A possible pipe length is about 1 m. However, longer or shorter pipe can also be provided.

Furthermore the spacers and the flange on the outer pipe are only illustrated by way of example. Other flanges and other types of spacers can also be used. It may also be that the attachment of a flange is not necessary, since for example no joining to a further pipe is required or the joining takes place in another way.

Moreover, a corresponding flange may of course also be provided at the other end of the pipe.

The welded connection between the two pipe segments of the outer pipe is made for example by laser welding.

Figure 2B:
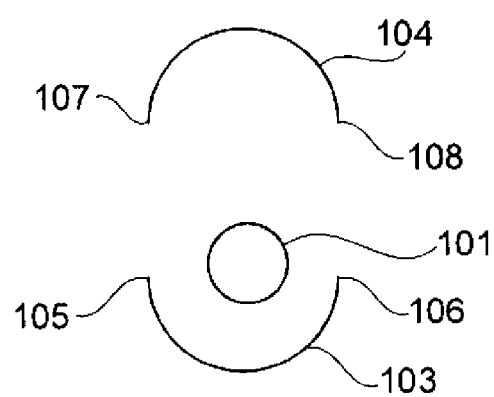
Figure 2C:
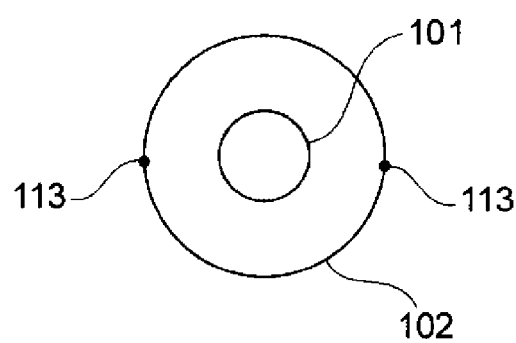

FIGS. 2A-2C show a method for production of a double-wall pipe according to one of various embodiments of the present disclosure. First of all the inner pipe 101 and an initial pipe 110 which will later constitute the outer pipe are formed separately from one another so that they have a neutral bending line 112 extending in a similar manner (FIG. 2A). The initial pipe 110 is generally split along the neutral bending line, so that two pipe segments 103, 104 in the form of half-shells are produced. Then the inner pipe 101 provided with spacers is introduced into the lower half-shell 103 of the outer pipe (FIG. 2B). Next the outer pipe is joined together again along the previously parted bending line. For this purpose the two pipe segments in the form of half-shells 103, 104 are joined together along their longitudinal edges 105, 106, 107, 108 for example by welding (FIG. 2C). In this case weld seams are produced at the former parting points 113.

In the next step the flanges of the outer pipe are joined and the surface protection is applied to the inner and outer faces of the outer pipe. For this, the flange regions and electrical contact surfaces can be covered.

Thus a significant reduction in the weight of components can be achieved. A criterion for the internal diameter of the outer pipe is the minimum distance to be maintained from the inner pipe (or, as in the prior art, from the inner hose), so that when a metal inner pipe is used, because of its greater strength the outer pipe diameter can be reduced. This may lead to a reduced amount of space being required for the pipe system and to reduced production costs, since the semi-finished products can have smaller dimensions and less material is necessary in order to produce the outer pipe.

Figure 3:
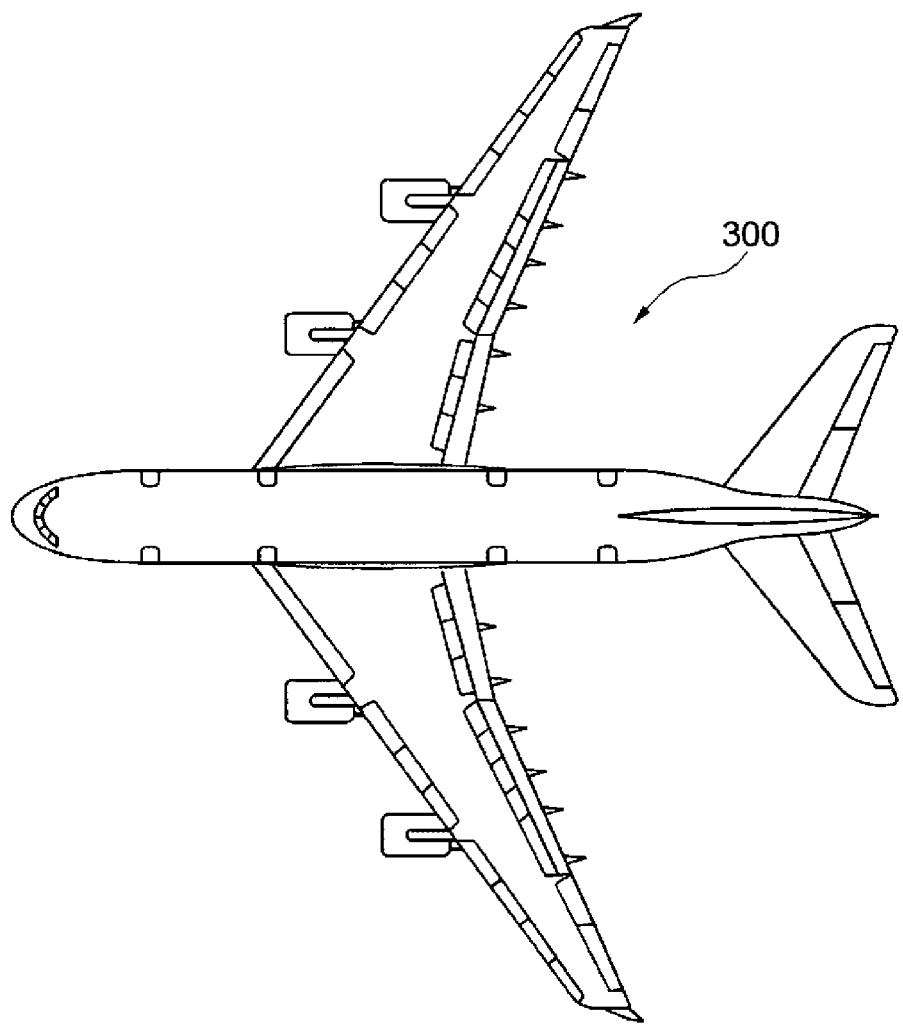
FIG. 3 shows an aircraft with double-wall pipes according to various embodiments of the present disclosure.

FIG. 3 shows an aircraft 300 which has the double-wall pipes described above. These pipes are used for example as fuel lines between a fuel tank and a propulsion unit or for connecting a trim tank to a main tank.

Figure 4:
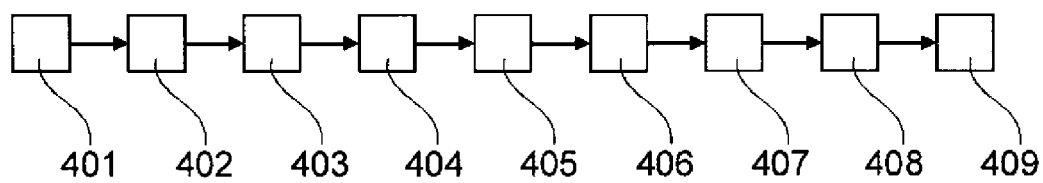
FIG. 4 shows a flow diagram of a method according to one exemplary embodiment of the present disclosure.

FIG. 4 shows a flow diagram of a method according to various exemplary embodiments of the present disclosure. In 401 the formation of an inner pipe takes place. In 402 an initial pipe is formed separately from said inner pipe, and has a correspondingly larger diameter than the inner pipe. In 403 this initial pipe is parted along two parting lines into two pipe segments in the form of a half-shell and in 404 the inner pipe is provided with spacers. In 405 the inner pipe is laid into one of the two pipe segments. In 406 the second pipe segment is brought into position and the two pipe segments are connected to one another in 407, for example by welding along the two parting lines.

In 408 flanges can be attached to the pipe ends and in 409 the application of a surface protection to the inner and outer faces of the outer pipe takes place.

By the use of metal double-wall pipes (so-called pipe-in-pipe assemblies) the total weight of components can be significantly reduced by comparison with double-wall pipes with coaxially attached inner pipes, since the heavy hose which is used in the conventional solution is replaced by a lightweight inner pipe. The introduced hose is relatively expensive, whereas the introduced pipe can be produced very simply and cost-effectively. Moreover in this way double-wall pipes with substantial or multiple curvatures are possible. For the various teachings of the present disclosure it is irrelevant as to which metallic materials are used for the inner or outer pipe. If welding methods are employed for the joining process, the use of metals or metal alloys which can be welded is possible. For example the pipes can be fabricated from titanium or aluminum.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A double-wall pipe for a transport means, comprising:
    an outer pipe; and
    an inner pipe extending in the outer pipe,
        wherein the inner pipe is designed to convey a fluid and is spaced apart from the outer pipe, and the outer pipe has exactly two pipe segments in the form of half-shells which are joined together along their longitudinal edges in order to form the outer pipe;
        wherein the double-wall pipe is a bent pipe;
        wherein the longitudinal edges of the pipe segments extend along a neutral bending line of the double-wall pipe;
        wherein the neutral bending line is a common centre line of the inner pipe and the outer pipe;
        wherein a curvature progression of the double-wall pipe is such that it has an inflection point at which the curvature of the double-wall pipe changes.

2. The double-wall pipe according to claim 1, wherein the inner pipe is metallic.

3. The double-wall pipe according to claim 1, wherein the outer pipe is metallic.

4. The double-wall pipe according to claim 1, wherein the two pipe segments in the form of half-shells of the outer pipe are produced by splitting an initial pipe.

5. The double-wall pipe according to claim 1, wherein the two pipe segments in the form of half-shells of the outer pipe are produced by parting the initial pipe along the neutral bending line of the bent initial pipe.

6. The double-wall pipe according to claim 1, wherein the double-wall pipe is a fuel line or hydraulic line.

7. A method for producing a double-wall pipe or a T-connection for connecting double-wall pipes, the method comprising:
    forming a bent inner pipe;
    forming a bent initial pipe which has a larger diameter than the inner pipe, wherein the initial pipe is bent such that each of the initial pipe and the inner pipe comprise a neutral bending line extending in a similar manner;
    wherein a curvature progression of the double-wall pipe is such that it has an inflection point at which the curvature of the double-wall pipe changes;
    parting the initial pipe into exactly two pipe segments, namely a first and a second pipe segment in the form of half-shells along the neutral bending line of the initial pipe, wherein the neutral bending line is a common centre line of the inner pipe and the outer pipe;
    positioning the inner pipe in the first pipe segment in the form of a half-shell; and
    joining together the two pipe segments in the form of half-shells for forming an outer pipe, wherein the longitudinal edges of the pipe segments extend along the neutral bending line.

8. The method according to claim 7, wherein at least one of the inner pipe and the initial pipe is metallic.

9. The method according to claim 7, further comprising: joining a flange onto one end of the outer pipe.

10. The method according to claim 7, further comprising: applying a surface protection to an inner face and to an outer face of the outer pipe.

11. The method according to claim 7, wherein the joining together of the two pipe segments in the form of half-shells takes place by welding.

12. The method according to claim 11, wherein the joining together of the two pipe segments in the form of half-shells takes place by laser welding.

13. A transportation device, comprising:
- a double wall pipe for a hydraulic line or fuel line of the transportation device, the double wall pipe including an outer pipe and an inner pipe extending in the outer pipe, the inner pipe designed to convey a fluid and spaced apart from the outer pipe,
- wherein the outer pipe has exactly two pipe segments in the form of half-shells which are joined together along their longitudinal edges in order to form the outer pipe;
- wherein the double-wall pipe is a bent pipe; and
- wherein the longitudinal edges of the pipe segments extend along a neutral bending line of the double-wall pipe;
- wherein the neutral bending line is a common centre line of the inner pipe and the outer pipe;
- wherein a curvature progression of the double-wall pipe is such that it has an inflection point at which the curvature of the double-wall pipe changes.

14. The transportation device according to claim 13, wherein the transportation device is an aircraft.

15. The transportation device according to claim 13, wherein the inner pipe is metallic.

16. The transportation device according to claim 13, wherein the outer pipe is metallic.

17. The transportation device according to claim 13, wherein the two pipe segments in the form of half-shells of the outer pipe are produced by splitting an initial pipe.

18. The transportation device according to claim 13, wherein the two pipe segments in the form of half-shells of the outer pipe are produced by parting the initial pipe along the neutral bending line of the bent initial pipe.

* * * * *